May 1, 1956
W. J. FISHER ET AL
2,743,831
TUBULAR TIRE CARRIER
Filed Feb. 7, 1952
2 Sheets-Sheet 1
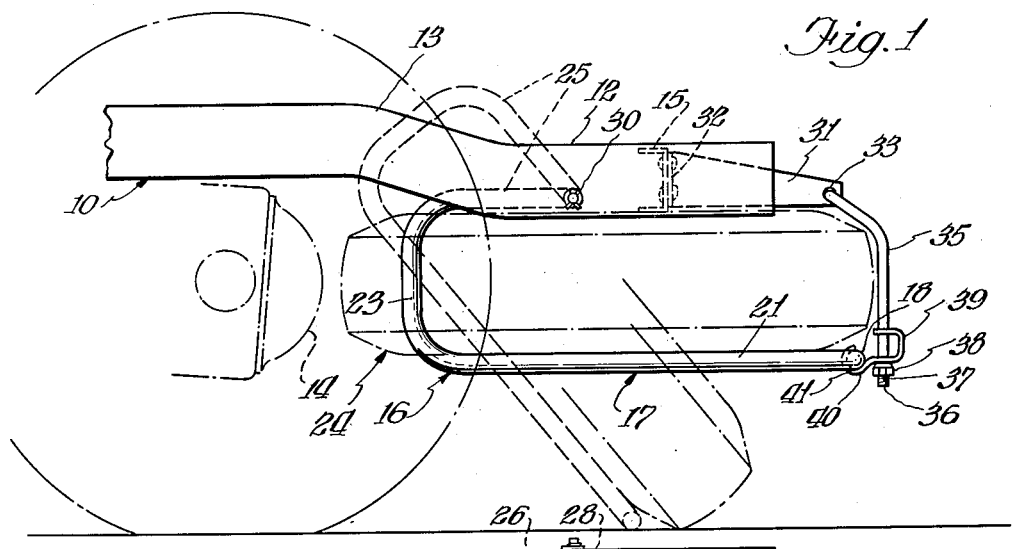
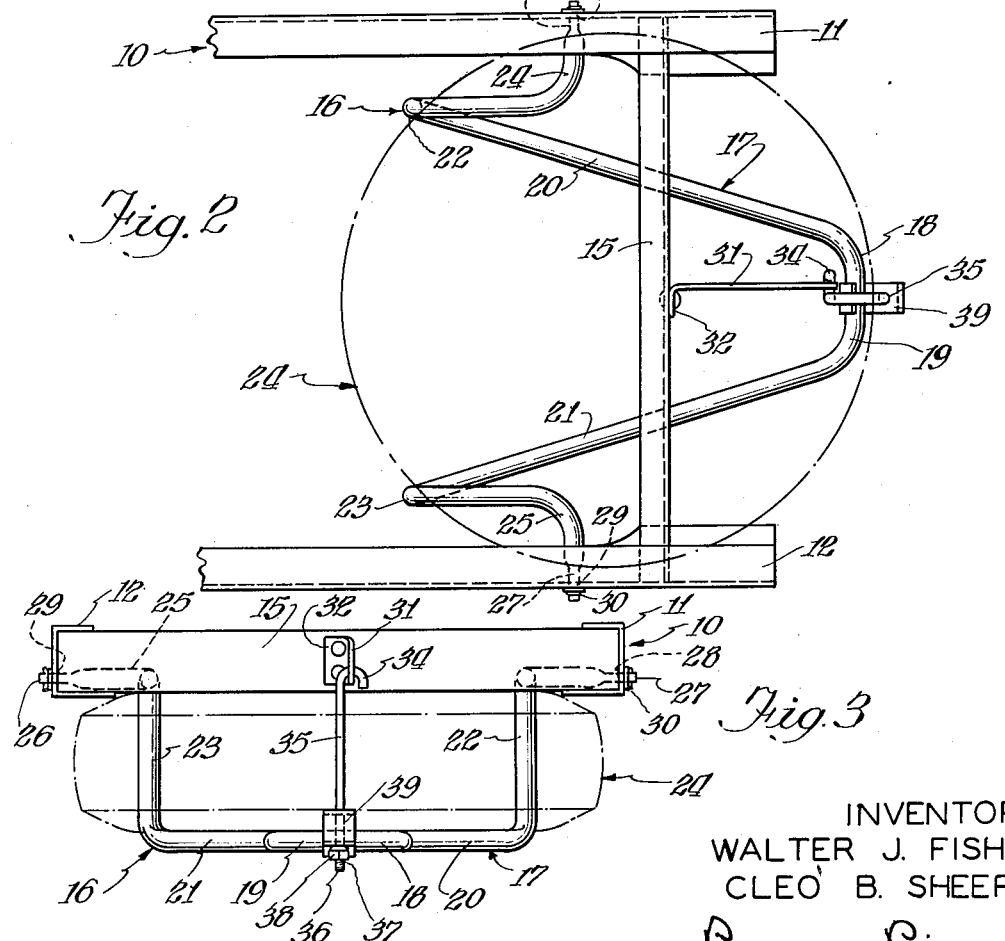
INVENTORS
WALTER J. FISHER
CLEO B. SHEERIN
Paul O. Pippel
ATT'Y.

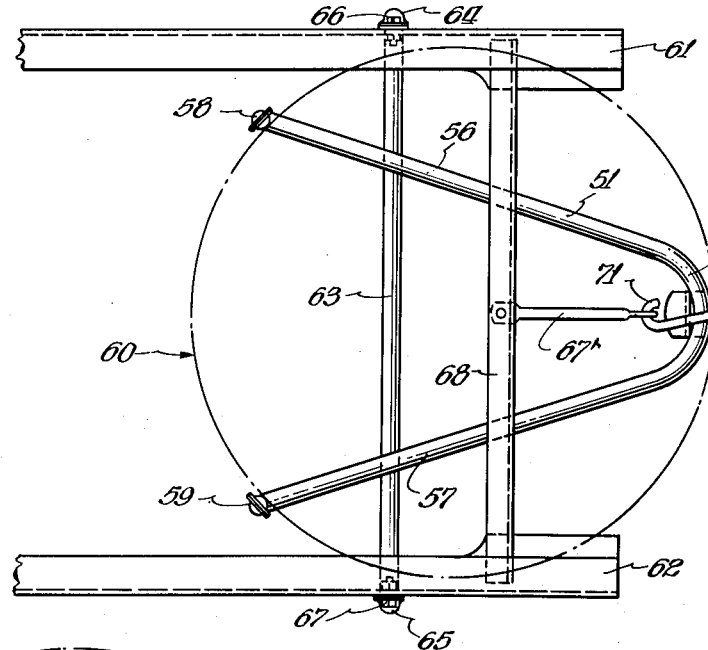

United States Patent Office 2,743,831
Patented May 1, 1956

2,743,831

TUBULAR TIRE CARRIER

Walter J. Fisher and Cleo B. Sheerin, Fort Wayne, Ind., assignors to International Harvester Company, a corporation of New Jersey Application February 7, 1952, Serial No. 270,424

4 Claims. (Cl. 214—454)

This invention relates to a tire carrier construction for vehicles and more particularly to new and improved spare-tire carrier construction adapted to be mounted at the rear of a conventional automotive vehicle.

It has become common practice in the operation of commercial vehicles such as trucks or the like to carry a spare tire and wheel unit for emergency use. Because cargo space is critical in commercial vehicles, many devices have been constructed by which the spare tire and wheel unit may be compactly stored in an elevated or clamped position beneath the body or cargo space of the vehicle and yet rendered conveniently accessible for removal from and replacement thereon of a wheel and tire unit quickly and easily. However, the tire carriers of the underslung type described above have one serious drawback. They are either complex structures having many parts and are thus costly to manufacture or they are flimsy structures which lack the stability and rigidity needed for long periods of trouble-free efficient operation. It is, therefore, the primary object of the present invention to provide a tire carrier construction which obviates the disadvantages of prior tire carriers as mentioned above.

Another object is the provision of a strong, light-weight tire carrier frame structure which is formed fom a single piece of tubular steel.

A further object is the provision of a novel clamping device for securing the tire carrier frame structure in its raised position which is quickly and safely engageable with a portion of the tubular frame structure.

A still further object is to provide a tire carrier frame structure which includes a longitudinally disposed V-shaped section for supporting the tire.

Still another object is to provide a pair of vertical sections which are integrally formed with a longitudinally disposed V-shaped section for limiting the forward movement of the tire and wheel unit being carried by the tire carrier structure.

The foregoing and other important objects and desirable features inherent in and encompassed by the invention, together with many of the purposes and uses thereof, will become readily apparent from a reading of the ensuing description in conjunction with the annexed drawings, in which:

Fig. 1 illustrates a tire carrier embodying the invention attached to the rear portion of an automotive vehicle frame, the dotted lines showing the tire carrier in its lowered position for inserting or removing a tire and wheel unit;

Fig. 2 is a plan view of the structure shown in Fig. 1;

Fig. 3 is a rear elevational view of the structure shown in Fig. 1.

Fig. 4 is a plan view of a modified form of the invention;

Fig. 5 is a side elevational view of the tire carrier structure shown in Fig. 4; and Fig. 6 is a rear elevational view of the structure shown in Fig. 4.

Referring to the drawings in detail wherein like reference characters designate like elements throughout the various views there is shown a vehicle frame 10 having a pair of channel-shaped longitudinally extending, transversely spaced side sill members 11, 12. The side sill members 11, 12 are formed with a humped portion 13 to provide clearance over a rear axle structure 14. Leaf spring assemblies (not shown) resiliently connect the rear axle structure 14 to the frame 10 in a conventional manner. The side sill members 11 and 12 are interconnected by means of a plurality of transversely extending cross members (only one cross member 15 is shown in the drawings).

The tire carrier frame structure, designated in its entirety by the reference character 16, is formed from a single piece of tubular steel and includes a substantially V-shaped section 17, as best shown in Fig. 2. The apex 18 of the V-shaped section 17 is the rearwardmost portion of the frame structure 16 and is in reality a short transversely extending, cylindrically shaped portion 19. The portion 19 serves as the connecting portion or member which is engageable by a clamping structure, to be described hereinafter, for supporting the tire carrier frame structure 16 in its raised or clamped position as shown in Fig. 1.

The legs 20, 21 of the V-shaped section 17 extend forwardly from the portion 19 and diverge toward side sill members 11 and 12 respectively. Vertical sections 22, 23 having a length at least equal to the thickness of the tire and wheel unit 24 to be carried by the tire carrier, extend, respectively, normally from the legs 20, 21. It will be readily seen, by noting Fig. 2, that the vertical sections 22, 23 limit the forward movement of the tire and wheel unit 24 by abutting the outer periphery of the same at two transversely spaced points. Formed integrally with the vertical sections 22, 23 are rearwardly extending curved portions 24 and 25. It will be noted that the horizontal plane containing the curved portions 24 and 25 is parallel to the horizontal plane in which the V-shaped section 17 lies. The curved portions 24 and 25 extend transversely in opposite directions and have sections 26, 27 of reduced diameter which project through openings 28, 29 formed in side sill members 11, 12 respectively. It will be obvious that the frame structure 16 is capable of swinging about a transverse horizontal axis through the openings 28, 29. Cotter pins 30 are shown for preventing accidental removal of the sections 26, 27 from the openings 28, 29 but it is to be understood that other suitable securing means could be used equally as well. It will be appreciated from the foregoing that the entire frame structure 16 is formed from a single piece of tubular steel in such a manner that a strong, light-weight structure is the result which is swingable about a transverse horizontal axis from the dotted line position shown in Fig. 1 wherein a tire and wheel unit may be easily placed on or removed from the frame structure to the raised position shown in the same figure.

A rearwardly extending bracket 31 is rigidly fastened to cross member 15 by rivets or like midway between the side sill members 11 and 12. The rearward end 32 of the bracket 31 is provided with an aperture 33 for pivotally receiving the hook-shaped end 34 of a rod-like supporting member 35. The opposite end 36 of the member 35 has threads 37 formed thereon which are engageable by a clamping nut 38. Slidably mounted on the supporting member 35 and abutting the nut 38 is a U-shaped bracket member 39. The lower leg 40 of the member 39 has an arcuately-formed extension 41. The inner diameter of the extension 41 is approximately equal to the outside diameter of the portion 19 of the V-shaped section 17.

In operation, when the operator desires to insert a spare tire or a tire and wheel unit into the carrier, the frame structure 16 is swung to the lowered position shown in Fig. 2. The spare tire and wheel unit 24 is thrust into position in engagement with the vertical sections 22, 23 and the frame structure 16, together with tire and wheel unit 24, is tilted upwardly into the position shown in Fig. 1. Thereafter, the supporting member 35 and bracket member 39 are swung clockwise as viewed in Fig. 1 until the extension 41 engages the cylindrical portion 19 of the frame structure 16. The operator then tightens the clamping nut 38 with a suitable wrench which moves the bracket member 39 upwardly along the supporting member 35 and raises the frame structure 16 to the substantially horizontal raised position shown in Fig. 1. The vertical sections 22, 23 and the supporting member 35 position the tire and wheel unit 24 to avoid excessive shifting movement of the same with respect to the vehicle frame 10 in a horizontal direction during operation of the vehicle. Similarly vertical movement of the tire and wheel unit 24 with respect to the vehicle frame 10 is substantially eliminated by having the unit 24 confined between the curved portions 24 and 25 and the V-shaped section 17. To remove the tire and wheel unit 24 it is only necessary to loosen the clamping nut 38 sufficiently to allow the bracket member extension 41 to become disengaged from the cylindrical portion 19. The supporting member 35 is then swung out of the path of the cylindrical portion 19 whereupon the entire frame structure 16 and wheel and tire unit 24 pivot to the dotted line position shown in Fig. 1 and the unit 24 may be easily removed from the frame structure 16.

In the modified tire carrier frame structure 50, as shown in Figs. 4, 5, and 6, a longitudinally disposed, V-shaped section 51 is formed from a single piece of tubular steel. A channel-shaped bracket 52, having a short extension 53, is welded to the apex 54 of the section 51. The extension 53 is provided with an aperture 55 for a purpose which will be explained hereinafter. The diverging legs 56, 57 of the V-shaped section 51 are provided with integrally formed vertical sections 58, 59, respectively, for limiting the relative forward movement of a tire and wheel unit 60 being carried by the tire carrier frame structure 50 with respect to the vehicle frame.

Extending transversely between the side sill members 61, 62 is a U-shaped tubular member 63. The vertical legs 64, 65 are pivotally connected to the side sill members 61, 62 respectively by means of bolts 66 and nuts 67. The bight section 78 of the member 63 passes beneath the V-shaped section 51 intermediate the vertical sections 58, 59 and the apex 54 and is welded thereto. From the foregoing it will be obvious that the frame structure 50 is capable of swinging about a transverse axis through bolts 66.

A rearwardly extending bracket 67' is riveted to a cross member 68 midway between the side sill members 61 and 63. An aperture 69 is provided in the rearward end 70 of the bracket 67' for pivotally receiving the hook-shaped end 71 of a rod-like supporting member 72. Threads 73 are formed on the opposite end 74 of the supporting member 72 which are engageable by a pair of nuts 75, 76. It will be noted that with the lower clamping nut 75 removed the lower end 74 of the supporting member 72 is insertable in the aperture 55 formed in the extension 53. The clamping nut 75 can then be screwed on the supporting member 72 to clamp the extension 53 between it and the nut 76 and thereby support the V-shaped section 51 as shown in Fig. 5. The upper nut 76 acts as an adjustable stop since its location along the supporting member 72 may be varied to insure a snug positioning of the tire and wheel unit 60 between the V-shaped section 51 and the underside of the side sill members 61 and 62 and the cross member 68 when the tire carrier structure is in its raised or clamped position.

The embodiments of the invention chosen for the purposes of illustration and description herein are those preferred for achieving the objects of the invention and developing the utility thereof in the most desirable manner, due regard being had to existing factors of economy, simplicity of design and construction, production methods, and the improvements sought to be effected. It will be appreciated therefore that the particular structural and functional aspects emphasized herein are not intended to exclude, but rather to suggest, such other adaptations and modifications of the invention as fall within the spirit and scope of the invention as defined by the appended claims.

What is claimed is:

1. A tire carrier construction for vehicles having a longitudinal frame including a pair of transversely spaced side sill members comprising, a tire carrier frame structure including a single, integral tubular member having a substantially V-shaped section disposed longitudinally with respect to said frame, a vertical section extending normally toward said vehicle frame from one end of each leg of said V-shaped section, said vertical sections being adapted to abut the tire to be carried and limit the movement of the tire in one direction, and a pair of sections spaced from and substantially parallel to said V-shaped section, each of said last-mentioned sections having one end joining one vertical section and its opposite end pivotally connected to a respective side sill member whereby the tire carrier frame structure is swingable about a transverse horizontal axis with respect to the vehicle frame from a first position wherein the tire may be placed on or removed from the tire carrier frame structure to a clamped position, each of said last-mentioned sections extending longitudinally toward said apex and transversely from a respective vertical section whereby said transverse horizontal axis is longitudinaly spaced between the apex of said V-shaped section and said vertical sections; and clamping means for releasably maintaining said tire carrier frame structure in said clamped position including a supporting member having one end pivotally connected to said vehicle frame and its opposite end provided with a threaded portion, said supporting member having a U-shaped bracket slidably mounted thereon, one leg of said bracket having a hooked-shaped extension engageable with the apex of said V-shaped section, and a clamping nut cooperable with said threaded portion and abutting said bracket for moving said bracket along said supporting member.

2. A tire carrier for vehicles having a longitudinal frame comprising, a tire carrier frame structure including a single, integral tubular member having a substantially V-shaped section disposed longitudinally with respect to said frame, a vertical section extending substantially normally from each leg of said V-shaped section, said vertical sections being adapted to abut the tire to be carried and limit the movement of the tire in one direction, said vertical sections having sections joined thereto and extending longitudinally and transversely therefrom for pivotally connecting said tire carrier frame to said vehicle frame, said last mentioned sections lying in a plane parallel to a plane containing said V-shaped section and the connections of said sections to said vehicle frame being longitudinally spaced from said vertical sections in a direction toward the apex of said V-shaped section and being longitudinally spaced between said apex and said vertical sections; and clamping means for releasably maintaining said tire carrier frame structure in a clamped position wherein said vertical sections are substantially normal with respect to said vehicle frame including a supporting member having one end pivotally connected to said vehicle frame and its opposite end provided with a threaded portion, said supporting member having a U-shaped bracket slidably mounted thereon, one leg of said bracket having a hooked-shaped extension engageable with the apex of said V-shaped section, and a clamping nut cooperable with said threaded portion and abutting said bracket for moving said bracket along said supporting member.

3. A tire carrier for vehicles having a longitudinal frame comprising, a tire carrier frame structure including a single, integral member having a substantially V-shaped section disposed longitudinally with respect to said frame, the apex of said V-shaped section extending transversely and having a cylindrical outer contour, a vertical section extending from each leg of said V-shaped section, said vertical sections being adapted to abut the tire to be carried and limit the movement of the tire in one direction and connecting means extending longitudinally toward said apex and transversely from each vertical section through respective opposite sides of said vehicle frame to pivotally attach said tire carrier frame structure to said vehicle frame whereby said frame structure is swingable with respect to said vehicle frame about a transversely extending axis longitudinally spaced between said vertical sections and said apex of said V-shaped section; and clamping means for releasably maintaining said tire carrier frame structure in a raised, clamped position wherein said V-shaped section is substantially parallel with respect to said vehicle frame including a supporting member having one end pivotally connected to said vehicle frame and its opposite end provided with a threaded portion, said supporting member having a U-shaped element slidably mounted thereon, one leg of said element having an arcuately-shaped extension engageable with the cylindrical contour of the apex of said V-shaped section, and means cooperable with said threaded portion and engaging said element for moving said element along said supporting member.

4. A tire carrier for vehicles having a longitudinal frame comprising, a tire carrier frame structure including a single, integral member having a substantialy V-shaped section disposed longitudinally with respect to said frame, the apex of said V-shaped section having a cylindrical contour, a vertical section extending from the extreme end of each leg of said V-shaped section, said vertical sections being adapted to abut the tire to be carried and limit the movement of the tire in one direction, and connecting means extending longitudinally toward said apex and transversely from each vertical section through respective opposite sides of said vehicle frame to pivotally attach said tire carrier frame structure to said vehicle frame whereby said frame structure is swingable with respect to said vehicle frame about a transversely extending axis longitudinally spaced between said vertical sections and said apex of said V-shaped section; and adjustable clamping means for releasably maintaining said tire carrier frame structure in a raised, clamped position wherein said V-shaped section is substantially parallel with respect to said vehicle frame, said means including an element having an arcuately-shaped portion engageable with the cylindrical contour of the apex of said V-shaped section.

References Cited in the file of this patent

UNITED STATES PATENTS

| | | |
|---|---|---|
| 1,672,356 | Wasserfallen | June 5, 1928 |
| 2,320,856 | Ehlers | June 1, 1943 |
| 2,584,233 | Selzer | Feb. 5, 1952 |

FOREIGN PATENTS

| | | |
|---|---|---|
| 364,339 | Great Britain | Jan. 7, 1932 |